(12) United States Patent
Andrei et al.

(10) Patent No.: US 9,779,104 B2
(45) Date of Patent: Oct. 3, 2017

(54) EFFICIENT DATABASE UNDO / REDO LOGGING

(71) Applicants: Mihnea Andrei, Issy les Moulineaux (FR); Ivan Schreter, Malsch (DE); David Wein, St. Paul, MN (US); Shiping Chen, San Ramon, CA (US); Panfeng Zhou, Dublin, CA (US); Steffen Geissinger, Wiesloch (DE)

(72) Inventors: Mihnea Andrei, Issy les Moulineaux (FR); Ivan Schreter, Malsch (DE); David Wein, St. Paul, MN (US); Shiping Chen, San Ramon, CA (US); Panfeng Zhou, Dublin, CA (US); Steffen Geissinger, Wiesloch (DE)

(73) Assignee: SAP SE, Walldorf (DE)

( * ) Notice: Subject to any disclaimer, the term of this patent is extended or adjusted under 35 U.S.C. 154(b) by 339 days.

(21) Appl. No.: 14/553,833

(22) Filed: Nov. 25, 2014

(65) Prior Publication Data

US 2016/0147786 A1 May 26, 2016

(51) Int. Cl.
*G06F 17/30* (2006.01)
*G06F 11/14* (2006.01)

(52) U.S. Cl.
CPC .... *G06F 17/30162* (2013.01); *G06F 11/1402* (2013.01); *G06F 17/30185* (2013.01); *G06F 17/30336* (2013.01); *G06F 17/30368* (2013.01)

(58) Field of Classification Search
None
See application file for complete search history.

(56) References Cited

U.S. PATENT DOCUMENTS 5,701,480 A 12/1997 Raz
5,717,919 A 2/1998 Kodavalla et al.
(Continued)

FOREIGN PATENT DOCUMENTS

EP 2778961 A1 9/2014
WO WO-0129690 A2 4/2001

OTHER PUBLICATIONS

"HANA database lectures—Outline Part 1 Motivation—Why main memory processing." Mar. 2014 (Mar. 2014). XP055197666. Web. Jun. 23, 2015; URL:http://cse.yeditepe.edu.tr/-odemir/spring2014/cse415/HanaDatabase.pdf.
(Continued)

*Primary Examiner* — James Trujillo
*Assistant Examiner* — Aida Tessema
(74) *Attorney, Agent, or Firm* — Mintz Levin Cohn Ferris Glovsky and Popeo, P.C.

(57) ABSTRACT

Log records are accessed as part of a database operation in a database. The log records log insert, update, and delete operations in the database and include, for each row, a row position, a fragment identifier (ID), and a row ID. Thereafter, as part of the database operation, rows specified by the log records are located by: using the fragment identifier and the row position within the corresponding record of the log if the fragment with the corresponding fragment identifier is still available, otherwise, using the row identifier within the corresponding record of the log to look up the row position in an index of a corresponding row identifier column. The database operation is then finalized using the located rows. Related apparatus, systems, techniques and articles are also described.

20 Claims, 11 Drawing Sheets

(56) References Cited

U.S. PATENT DOCUMENTS

| | | | |
|---|---|---|---|
| 5,758,145 A | 5/1998 | Bhargava et al. | |
| 5,794,229 A | 8/1998 | French et al. | |
| 5,870,758 A | 2/1999 | Bamford et al. | |
| 6,275,830 B1 | 8/2001 | Muthukkaruppan et al. | |
| 6,282,605 B1 | 8/2001 | Moore | |
| 6,490,670 B1 | 12/2002 | Collins et al. | |
| 6,754,653 B2 | 6/2004 | Bonner et al. | |
| 6,865,577 B1 | 3/2005 | Sereda | |
| 7,698,712 B2 | 4/2010 | Schreter | |
| 8,024,296 B1* | 9/2011 | Gopinathan | G06Q 10/109 707/648 |
| 8,161,024 B2 | 4/2012 | Renkes et al. | |
| 8,364,648 B1 | 1/2013 | Sim-Tang | |
| 8,510,344 B1 | 8/2013 | Briggs et al. | |
| 8,650,583 B2 | 2/2014 | Schreter | |
| 8,732,139 B2 | 5/2014 | Schreter | |
| 8,768,891 B2 | 7/2014 | Schreter | |
| 9,098,522 B2 | 8/2015 | Lee et al. | |
| 9,141,435 B2 | 9/2015 | Wein | |
| 9,262,330 B2 | 2/2016 | Muthukumarasamy | |
| 9,268,810 B2 | 2/2016 | Andrei et al. | |
| 9,275,097 B2 | 3/2016 | DeLaFranier et al. | |
| 9,372,743 B1 | 6/2016 | Sethi et al. | |
| 2001/0051944 A1* | 12/2001 | Lim | G06F 17/30575 |
| 2002/0107837 A1* | 8/2002 | Osborne | G06F 11/1471 |
| 2002/0156798 A1 | 10/2002 | Larue et al. | |
| 2003/0028551 A1 | 2/2003 | Sutherland | |
| 2003/0065652 A1 | 4/2003 | Spacey | |
| 2003/0204534 A1 | 10/2003 | Hopeman et al. | |
| 2004/0034616 A1 | 2/2004 | Witkowski et al. | |
| 2004/0054644 A1 | 3/2004 | Ganesh et al. | |
| 2005/0097266 A1 | 5/2005 | Factor et al. | |
| 2005/0234868 A1 | 10/2005 | Terek et al. | |
| 2008/0046444 A1 | 2/2008 | Fachan et al. | |
| 2008/0247729 A1 | 10/2008 | Park | |
| 2009/0064160 A1 | 3/2009 | Larson et al. | |
| 2009/0094236 A1* | 4/2009 | Renkes | G06F 17/30336 |
| 2009/0254532 A1 | 10/2009 | Yang et al. | |
| 2009/0287737 A1 | 11/2009 | Hammerly | |
| 2010/0082545 A1 | 4/2010 | Bhattacharjee et al. | |
| 2010/0287143 A1 | 11/2010 | Di Carlo et al. | |
| 2011/0087854 A1 | 4/2011 | Rushworth et al. | |
| 2011/0145835 A1 | 6/2011 | Rodrigues et al. | |
| 2011/0153566 A1 | 6/2011 | Larson et al. | |
| 2011/0302143 A1 | 12/2011 | Lomet | |
| 2012/0047126 A1 | 2/2012 | Branscome et al. | |
| 2012/0102006 A1 | 4/2012 | Larson et al. | |
| 2012/0137081 A1 | 5/2012 | Shea | |
| 2012/0179877 A1 | 7/2012 | Shriraman et al. | |
| 2012/0191696 A1 | 7/2012 | Renkes et al. | |
| 2012/0233438 A1 | 9/2012 | Bak et al. | |
| 2012/0265728 A1 | 10/2012 | Plattner et al. | |
| 2012/0284228 A1 | 11/2012 | Ghosh et al. | |
| 2013/0054936 A1 | 2/2013 | Davis | |
| 2013/0091162 A1 | 4/2013 | Lewak | |
| 2013/0097135 A1 | 4/2013 | Goldberg | |
| 2013/0346378 A1 | 12/2013 | Tsirogiannis et al. | |
| 2014/0025651 A1 | 1/2014 | Schreter | |
| 2014/0101093 A1 | 4/2014 | Lanphear et al. | |
| 2014/0214334 A1 | 7/2014 | Plattner et al. | |
| 2014/0279930 A1 | 9/2014 | Gupta et al. | |
| 2014/0279961 A1* | 9/2014 | Schreter | G06F 17/30315 707/693 |
| 2015/0089125 A1 | 3/2015 | Mukherjee et al. | |
| 2015/0142819 A1 | 5/2015 | Florendo et al. | |
| 2016/0103860 A1* | 4/2016 | Bhattacharjee | G06F 17/30309 707/607 |
| 2016/0125022 A1* | 5/2016 | Rider | G06F 17/30377 707/607 |
| 2016/0147445 A1 | 5/2016 | Schreter et al. | |
| 2016/0147447 A1 | 5/2016 | Blanco et al. | |
| 2016/0147448 A1 | 5/2016 | Schreter et al. | |
| 2016/0147449 A1 | 5/2016 | Andrei et al. | |
| 2016/0147457 A1 | 5/2016 | Legler et al. | |
| 2016/0147459 A1 | 5/2016 | Wein et al. | |
| 2016/0147617 A1 | 5/2016 | Lee et al. | |
| 2016/0147618 A1 | 5/2016 | Lee et al. | |
| 2016/0147750 A1 | 5/2016 | Blanco et al. | |
| 2016/0147776 A1 | 5/2016 | Florendo et al. | |
| 2016/0147778 A1 | 5/2016 | Schreter et al. | |
| 2016/0147786 A1 | 5/2016 | Andrei et al. | |
| 2016/0147801 A1 | 5/2016 | Wein et al. | |
| 2016/0147804 A1 | 5/2016 | Wein et al. | |
| 2016/0147806 A1 | 5/2016 | Blanco et al. | |
| 2016/0147808 A1 | 5/2016 | Schreter et al. | |
| 2016/0147809 A1 | 5/2016 | Schreter et al. | |
| 2016/0147811 A1 | 5/2016 | Eluri et al. | |
| 2016/0147812 A1 | 5/2016 | Andrei et al. | |
| 2016/0147813 A1 | 5/2016 | Lee et al. | |
| 2016/0147814 A1 | 5/2016 | Goel et al. | |
| 2016/0147819 A1 | 5/2016 | Schreter et al. | |
| 2016/0147820 A1 | 5/2016 | Schreter | |
| 2016/0147821 A1 | 5/2016 | Schreter et al. | |
| 2016/0147834 A1 | 5/2016 | Lee et al. | |
| 2016/0147858 A1 | 5/2016 | Lee et al. | |
| 2016/0147859 A1 | 5/2016 | Lee et al. | |
| 2016/0147861 A1 | 5/2016 | Schreter et al. | |
| 2016/0147862 A1 | 5/2016 | Schreter et al. | |
| 2016/0147904 A1 | 5/2016 | Wein et al. | |
| 2016/0147906 A1 | 5/2016 | Schreter et al. | |

OTHER PUBLICATIONS

"HANA Persistence: Shadow Pages." Jun. 2013. *Yeditepe Üniversitesi Bilgisayar Mühendisliği Bölümü*. Web. Apr. 21, 2016. <http://cse.yeditepe.edu.tr/~odemir/spring2014/cse415/Persistency.pptx>.

"Optimistic concurrency control." Wikipedia: The Free Encyclopedia. Wikimedia Foundation, Inc., Jul. 19, 2014. Web. Mar. 3, 2016.

Brown, E. et al. "Fast Incremental Indexing for Full-Text Information Retrieval." *VLDB '94 Proceedings of the 20th International Conference on Very Large Data Bases*. San Francisco: Morgan Kaufmann, 1994.

Jens Krueger et al. "Main Memory Databases for Enterprise Applications." Industrial Engineering and Engineering Management (IE &EM), 2011 IEEE 18th International Conference on, IEEE, Sep. 3, 2011 (Sep. 3, 2011), pp. 547-557, XP032056073.

Lemke, Christian, et al. "Speeding Up Queries in Column Stores." *Data Warehousing and Knowledge Discovery Lecture Notes in Computer Science* (2010): 117-29. Web. Apr. 21, 2016.

Lu, Andy. "SAP HANA Concurrency Control." *SAP Community Network*. Oct. 28, 2014. Web. Apr. 22, 2016. <http://scn.sap.com/docs/DOC-57101>.

Mumy, Mark. "SAP Sybase IQ 16.0 Hardware Sizing Guide." *SAP Community Network*. May 12, 2013. Web. Apr. 21, 2016. <http://www.sdn.sap.com/irj/scn/go/portal/prtroot/docs/library/uuid/c0836b4f-429d-3010-a686-c35c73674180?QuickLink=index&overridelayout=true&58385785468058>.

"NBit Dictionary Compression," Sybase, May 23, 2013. Web. Mar., 15, 2017 <http://infocenter.sybase.com/help/index.jsp?topic=/com.sybase.infocenter.dc1777.1600/doc/html/wil1345808527844.html>.

\* cited by examiner

EFFICIENT DATABASE UNDO / REDO LOGGING

TECHNICAL FIELD

The subject matter described herein relates an in-memory database system in which additional data is incorporated into undo/redo logs to allow for more efficient undo/redo operations.

BACKGROUND

Many databases log changes to records in redo logs and undo logs. The redo log protects the database from the loss of integrity because of system failures caused by power outages, disk failures, and the like. If such an event occurs, the recovery process can be applied to all transactions, both uncommitted as well as committed, to the data-files on disk, using the information in the redo log.

All log transactions that have been committed are redone while all open transactions that have not been committed are undone using the undo log. The undo records in the undo log can be used to rollback transactions, for example, when a rollback statement is issued. When a rollback statement is issued, undo records are used to undo changes that was made to the database by any uncommitted transactions. During recovery, undo records are used to undo any uncommitted changes applied from the redo log to the records. Undo records provide read consistency by maintaining the before image of the data for users who are accessing the data at the same time that another user is changing it.

SUMMARY

In one aspect, log records are accessed as part of a database operation in a database (e.g., an in-memory database, etc.). The log records log insert, update, and delete operations in the database and include, for each row, a row position, a fragment identifier (ID), and a row ID. The row position represents an offset of the corresponding row in an array. The fragment ID represents an immutable identifier of a fragment of a table corresponding to the row. The row ID represents an immutable identifier of the row. Thereafter, as part of the database operation, rows specified by the log records are located by: using the fragment identifier and the row position within the corresponding record of the log if the fragment with the corresponding fragment identifier is still available, otherwise, using the row identifier within the corresponding record of the log to look up the row position in an index of a corresponding row identifier column. The database operation is then finalized using the located rows.

The database operation can be, for example, a redo, undo, post-commit and/or cleanup action. The inserted, updated, or deleted rows can either be in a delta fragment or a main fragment. Each fragment can include a plurality of columns comprising: a row ID column, user data columns, and multi-version concurrency control (MVCC) information. Each fragment can include, for each column, an array of column values, and at least one array comprising the MVCC information. The row ID column can include an inverted index that maps row ID values to row positions.

For insert operations, new rows can be appended to the delta fragment. For delete operations, old rows can be invalidated in a corresponding fragment. The invalidated old rows can be in the main fragment or the delta fragment. A new row position can be assigned, during append time for an insert operation or update operation in a delta fragment, for a row that corresponds to an array offset where such row is stored. A merge operation can be initiated that moves rows from an old delta fragment to a new main fragment. A new delta fragment can be generated and, subsequently, the old delta fragment and the old main fragment are dropped after the rows are completely moved to the old delta fragment to the new main fragment. The new delta fragment and the new main fragment can be each assigned with their respective immutable fragment ID. New row positions can be assigned to rows moved from the old delta fragment to the new main fragment with such new row positions corresponding to a new array offset where each row is stored in the new main fragment so that each row maintains the same row ID.

The row identifier within the corresponding record of the log can be used to look up the row position in the inverted index of the corresponding row identifier column by searching, using the corresponding row ID contained in the log record, an inverted index of the row ID column within either of the delta fragment or main fragment, to look up the row position; and then using this row position as an offset within the arrays of the corresponding fragment to locate the needed row information. The row position specified in the log records cannot be used if a merge operation completes between creation of the log records and the database operation.

If a merge operation does not complete between creation of the log records and the database operation, using the fragment identifier and the row position as an offset within an array of a corresponding fragment to locate required row information is faster than using the row identifier to look up the row position in the index of a corresponding row identifier column and then using such row position as an offset within the arrays of the corresponding fragment to locate required row information.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many technical advantages. For example, the current subject matter is advantageous in that it directly uses row position for redo/undo operations when possible which provides for quicker and more efficient record access as compared to solely using an inverted index to look up the row position. In particular, the use of fragment identifiers helps obviate issues arising when there are two fragments containing a record with the same row identifier.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter includes a number of aspects that can be applied individually or in combinations of one or more such aspects to support a unified database table approach that integrates the performance advantages of in-memory database approaches with the reduced storage costs of on-disk database approaches. The current subject matter can be implemented in database systems using in-memory OLAP, for example including databases sized at several terabytes (or more), tables with billions (or more) of rows, and the like; systems using in-memory OLTP (e.g. enterprise resource planning or ERP system or the like, for example in databases sized at several terabytes (or more) with high transactional volumes; and systems using on-disk OLAP (e.g. "big data," analytics servers for advanced analytics, data warehousing, business intelligence environments, or the like), for example databases sized at several petabytes or even more, tables with up to trillions of rows, and the like.

Figure 1:
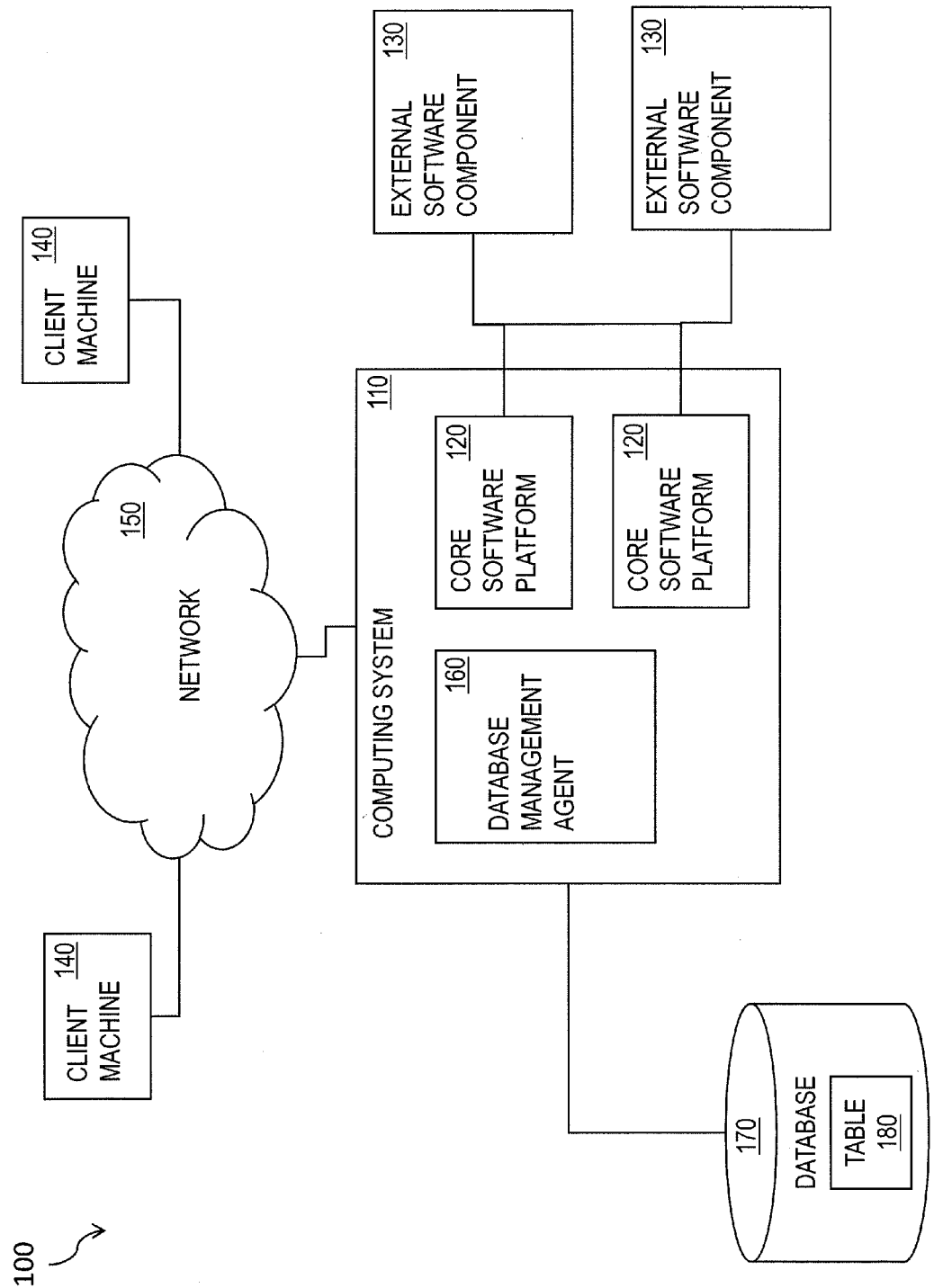
FIG. 1 is a diagram illustrating features of a business software system architecture.

The current subject matter can be implemented as a core software platform of an enterprise resource planning (ERP) system, other business software architecture, or other data-intensive computing application or software architecture that runs on one or more processors that are under the control of a specific organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. FIG. 1 shows a diagram 100 of a system consistent with such an implementation. A computing system 110 can include one or more core software platform modules 120 providing one or more features of the business software system. The computing system can also aggregate or otherwise provide a gateway via which users can access functionality provided by one or more external software components 130. Client machines 140 can access the computing system, either via a direct connection, a local terminal, or over a network 150 (e.g. a local area network, a wide area network, a wireless network, the Internet, or the like).

A database management agent 160 or other comparable functionality can access a database management system 170 that stores and provides access to data (e.g. definitions of business scenarios, business processes, and one or more business configurations as well as data, metadata, master data, etc. relating to definitions of the business scenarios, business processes, and one or more business configurations, and/or concrete instances of data objects and/or business objects that are relevant to a specific instance of a business scenario or a business process, and the like. The database management system 170 can include at least one table 180 and additionally include parallelization features consistent with those described herein.

Figure 2:
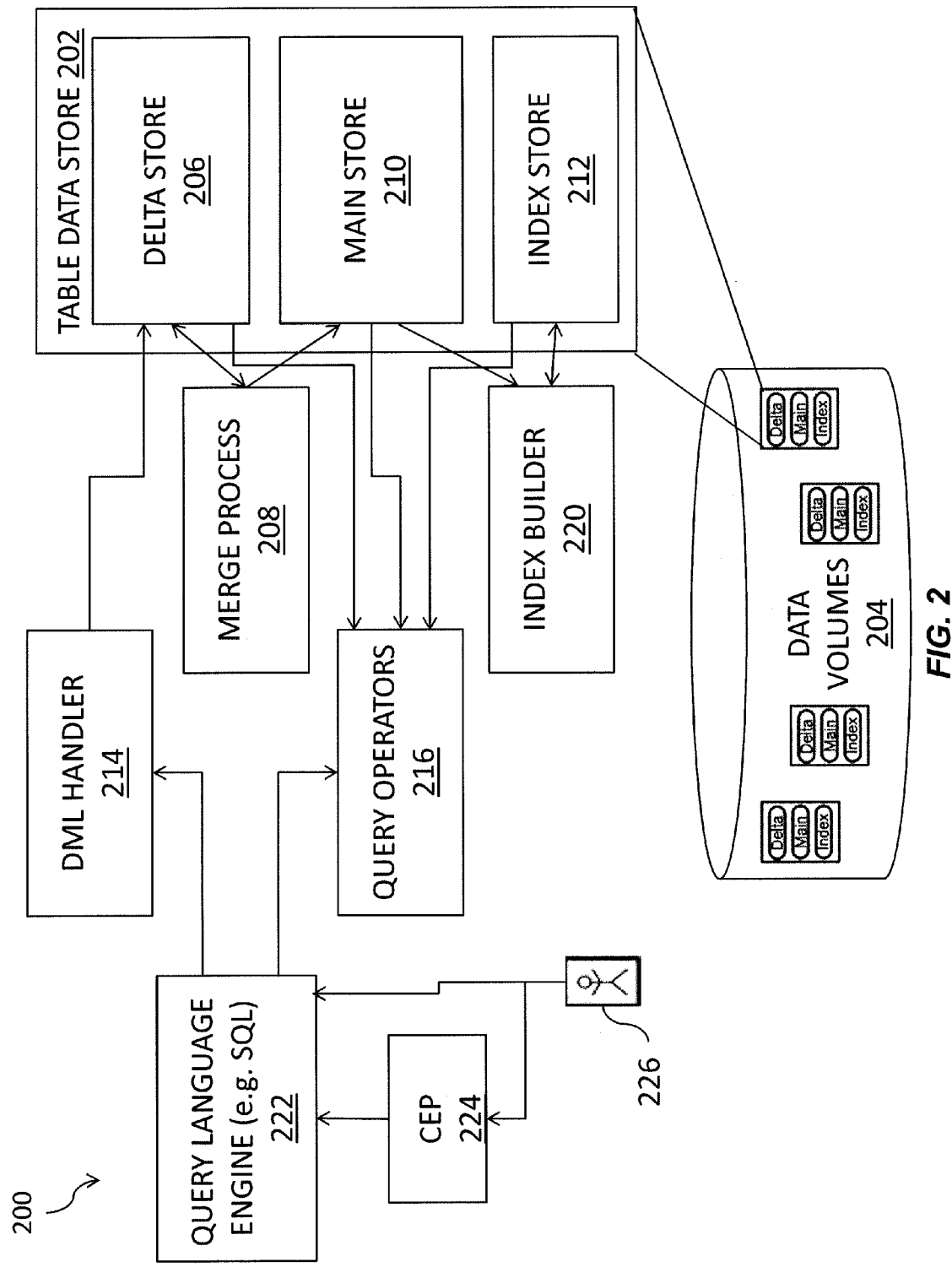
FIG. 2 is another diagram illustrating features of a business software system architecture.

FIG. 2 shows a block diagram of an architecture 200 illustrating features that can be included in a database or database management system consistent with implementations of the current subject matter. A table data store 202, which can be retained among a plurality of data volumes 204, can include one or more of a delta store 206 (e.g. a paged delta part, which can optionally be OLTP optimized and can optionally include a merge process 208), an index store 212 (e.g. one or more segmented indices), and a main store 210. The main store 210 can include a main part that is fragmented consistent with features described herein.

Figure 3:
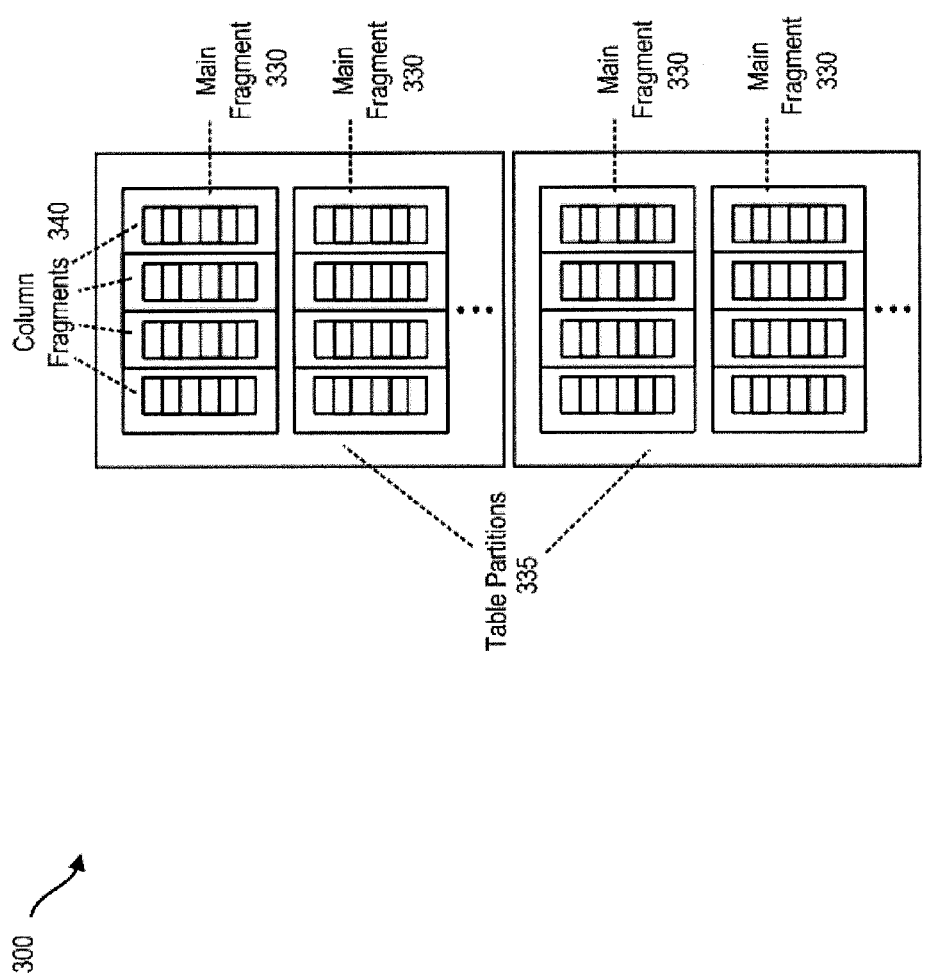
FIG. 3 is a schematic representation of fragments stored in a main store.

To achieve a best possible compression and also to support very large data tables, a main part of the table can be divided into one or more fragments. FIG. 3 shows a schematic representation 300 of the various fragments stored in main store 210. One or more main fragments or fragments 330 can be used for each table or column of a database. Small, manageable tables can be represented with a single fragment. Very large tables can be split into two or more table partitions 335. Each table partition may, in turn, include two or more fragments 330. Fragments 330 can be horizontal slices of the table to which they belong. Each fragment 330 can include one or more column fragments 340. Each column fragment 340 can have its own dictionary and value ID array consistent with the features described herein.

Fragments 330 can advantageously be sufficiently large to gain maximum performance due to optimized compression of the fragment and high in-memory performance of aggregations and scans. Conversely, such fragments can be sufficiently small to load a largest column of any given fragment into memory and to sort the fragment in-memory. Fragments can also be sufficiently small to be able to coalesce two or more partially empty fragments into a smaller number of fragments. As an illustrative and non-limiting example of this aspect, a fragment can contain one billion rows with a maximum of 100 GB of data per column. Other fragment sizes are also within the scope of the current subject matter. A fragment can optionally include a chain of pages. In some implementations, a column can also include a chain of pages. Column data can be compressed, for example using a dictionary and/or any other compression method. Table fragments can be materialized in-memory in contiguous address spaces for maximum performance. All fragments of the database can be stored on-disk, and access to these fragments can be made based on an analysis of the data access requirement of a query.

Referring again to FIG. 2, other parts of the architecture 200 can include a data manipulation language (DML) handling module or similar functionality 214, one or more query handling modules or similar functionality 216 (e.g. including multi-version concurrency control), an index builder 220 that supports the index store 212, a query language engine 222 (which can, for example, be a SQL engine), a complex events processing module (e.g. an event handler, a stream processing module, etc.) 224 for receiving inputs from a user 226, and the like.

Figure 4:
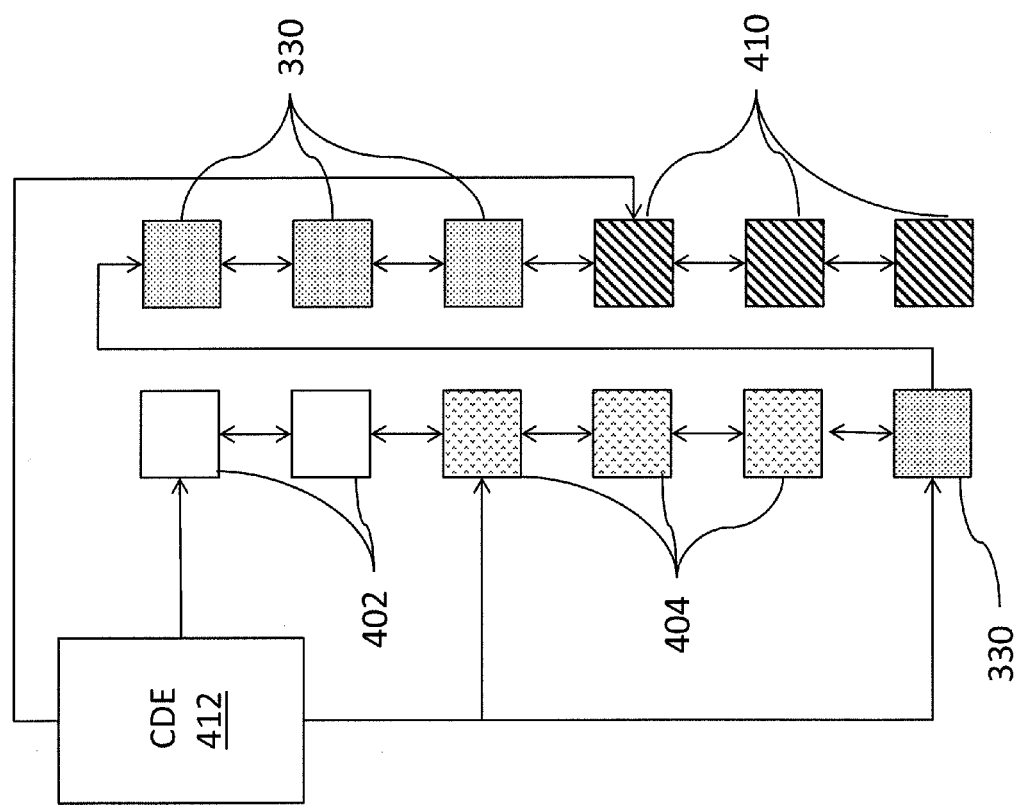
FIG. 4 is a diagram illustrating features of a unified table container page chain.

FIG. 4 shows a block diagram illustrating an example of a unified table container page chain 400. As described above, each fragment can optionally include a chain of pages. In general, a container can be represented as a page chain. A page chain can generally be characterized as a set of pages that are linked in a given order. The term pages, as used herein, refers to a basic unit of storage in a database. A page size is generally established when the database is built and typically cannot be changed. A representative page size can be on the order of 2 kB, 4 kB, 8 kB, 16 kB, or the like. Once the server is built, the value usually cannot be changed. Different types of pages can store different types of database objects. For example, data pages can store data rows or columns for a table. Index pages can store index rows for one or more levels of an index. Large object (LOB) pages can store data for text and image columns, for Java off-row columns, and the like.

Also as shown in FIG. 4, sub-chains of the page chain can be defined for a delta part, a main part, dictionaries, index segments (optionally, not shown in FIG. 2), and the like such that a "whole" of each of these entities contains one or more pages. In some implementations of the current subject matter, a delta part can include both "hot" delta fragments 402 and "cold" delta fragments 404, which can be stored separately. The main part can also be subdivided into main fragments 330. Each delta fragment 402, 404 can include or otherwise have an associated fragment identifier that uniquely identifies the fragment. These fragment identifiers, as will be described in further detail below, can be used to identify row positions as part of redo/undo operations. Pages containing dictionary-compressed columnar data 410 can refer to pages containing dictionaries for them. Individual table parts can be loaded into main memory on-demand. A merge process can be decoupled from transaction handling such that a merge process can be executed at recovery time (e.g. during log replay). A page chain, such as the example shown in FIG. 4, can be initiated by a container directory entry (CDE) 412.

A single RowID space can be used across pages in a page chain. A RowID, which generally refers to a logical row in the database, can be used to refer to a logical row in an in-memory portion of the database and also to a physical row in an on-disk portion of the database. A row index typically refers to physical 0-based index of rows in the table. A 0-based index can be used to physically address rows in a contiguous array, where logical RowIDs represent logical order, not physical location of the rows. In some in-memory database systems, a physical identifier for a data record position can be referred to as a UDIV or DocID. Distinct from a logical RowID, the UDIV or DocID (or a comparable parameter) can indicate a physical position of a row (e.g. a data record), whereas the RowID indicates a logical position. To allow a partition of a table to have a single RowID and row index space consistent with implementations of the current subject matter, a RowID can be assigned a monotonically increasing ID for newly-inserted records and for new versions of updated records across fragments. In other words, updating a record will change its RowID, for example, because an update is effectively a deletion of an old record (having a RowID) and insertion of a new record (having a new RowID). Using this approach, a delta store of a table can be sorted by RowID, which can be used for optimizations of access paths. Separate physical table entities can be stored per partition, and these separate physical table entities can be joined on a query level into a logical table.

When an optimized compression is performed during a columnar merge operation to add changes recorded in the delta store to the main store, the rows in the table are generally re-sorted. In other words, the rows after a merge operation are typically no longer ordered by their physical row ID. Therefore, stable row identifier can be used consistent with one or more implementations of the current subject matter. The stable row identifiers can optionally be a logical RowID. Use of a stable, logical (as opposed to physical) RowID can allow rows to be addressed in REDO/UNDO entries in a write-ahead log and transaction undo log.

Additionally, cursors that are stable across merges without holding references to the old main version of the database can be facilitated in this manner. To enable these features, a mapping of an in-memory logical RowID to a physical row index and vice versa can be stored. In some implementations of the current subject matter, a RowID column can be added to each table. The RowID column can also be amenable to being compressed in some implementations of the current subject matter.

Figure 5:
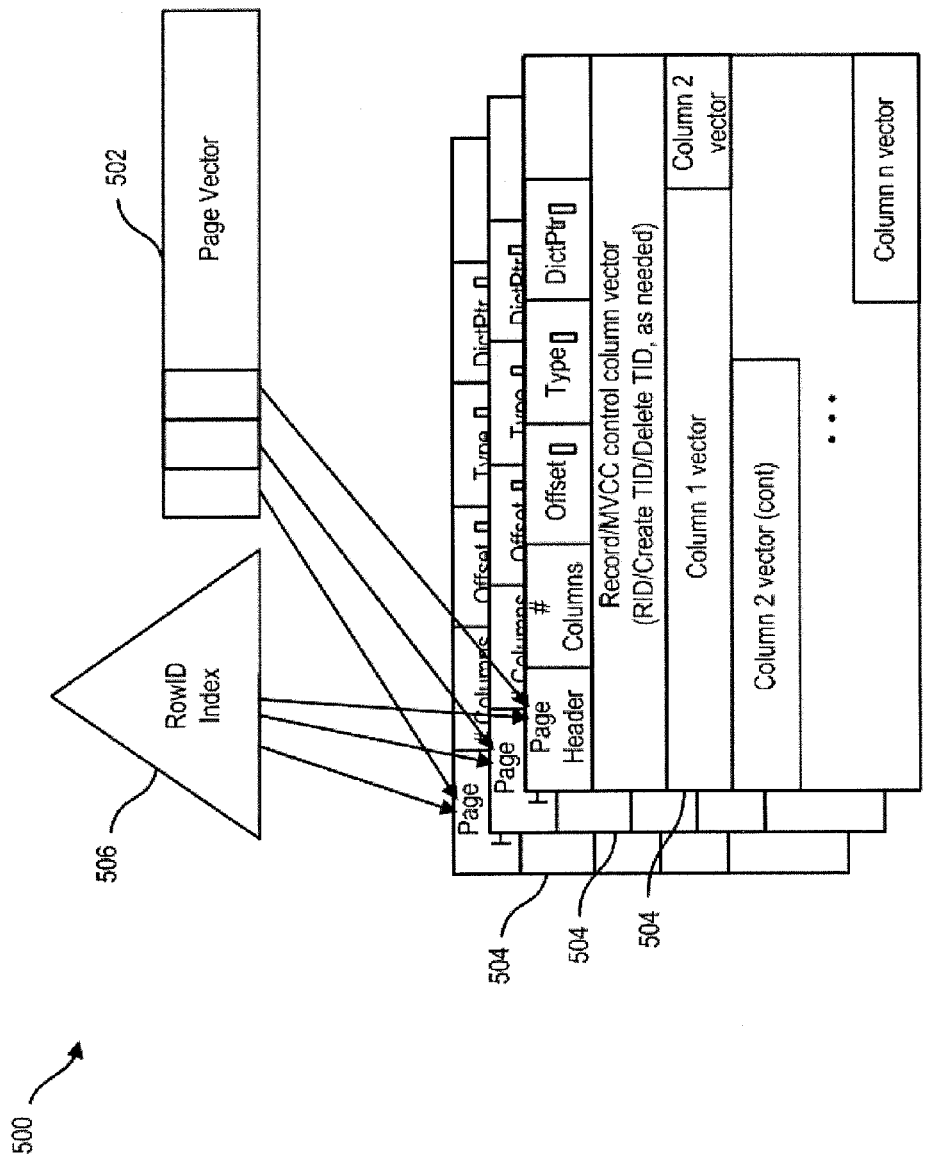
FIG. 5 is a diagram illustrating features of a unified table delta.

FIG. 5 shows a block diagram of a unified table delta 500 consistent with one or more implementations of the current subject matter. In some examples, a "hot" and "cold" delta approach can be used in which uncompressed data are retained in the "hot" delta part, while dictionary-compressed data are retained in the "cold" delta part with a mini-merge performed between the hot and cold parts. Such a delta part can be considered as a single container. As shown in FIG. 5, each delta sub-chain can have its own transient structure. In other words, a separate structure can be used for each delta. A page vector 502 can hold page handles to individual pages 504 and can allow a fast iteration over the pages 504 (for example as part of a column or table scan). A page handle to an individual page 504 can include a pin or the like held in memory. As used herein, the term "pin" refers to holding a particular data page (which may also have been stored on disk) in memory. As an example, if a page is not pinned, it can be cleared from memory. Pinning is typically done on data pages being actively accessed so as to avoid potential performance degradations associated with reading the page from disk into memory.

A RowID index 506 (which can be an inverted index) can serve as a search structure to allow a page 504 to be found based on a given interval of RowID values. The search time can be on the order of log n, where n is very small. The RowID index can provide fast access to data via RowID values. For optimization, "new" pages can have a 1:1 association between RowID and row index, so that simple math (no lookup) operations are possible. Only pages that are reorganized by a merge process need a RowID index in at least some implementations of the current subject matter.

Figure 6:
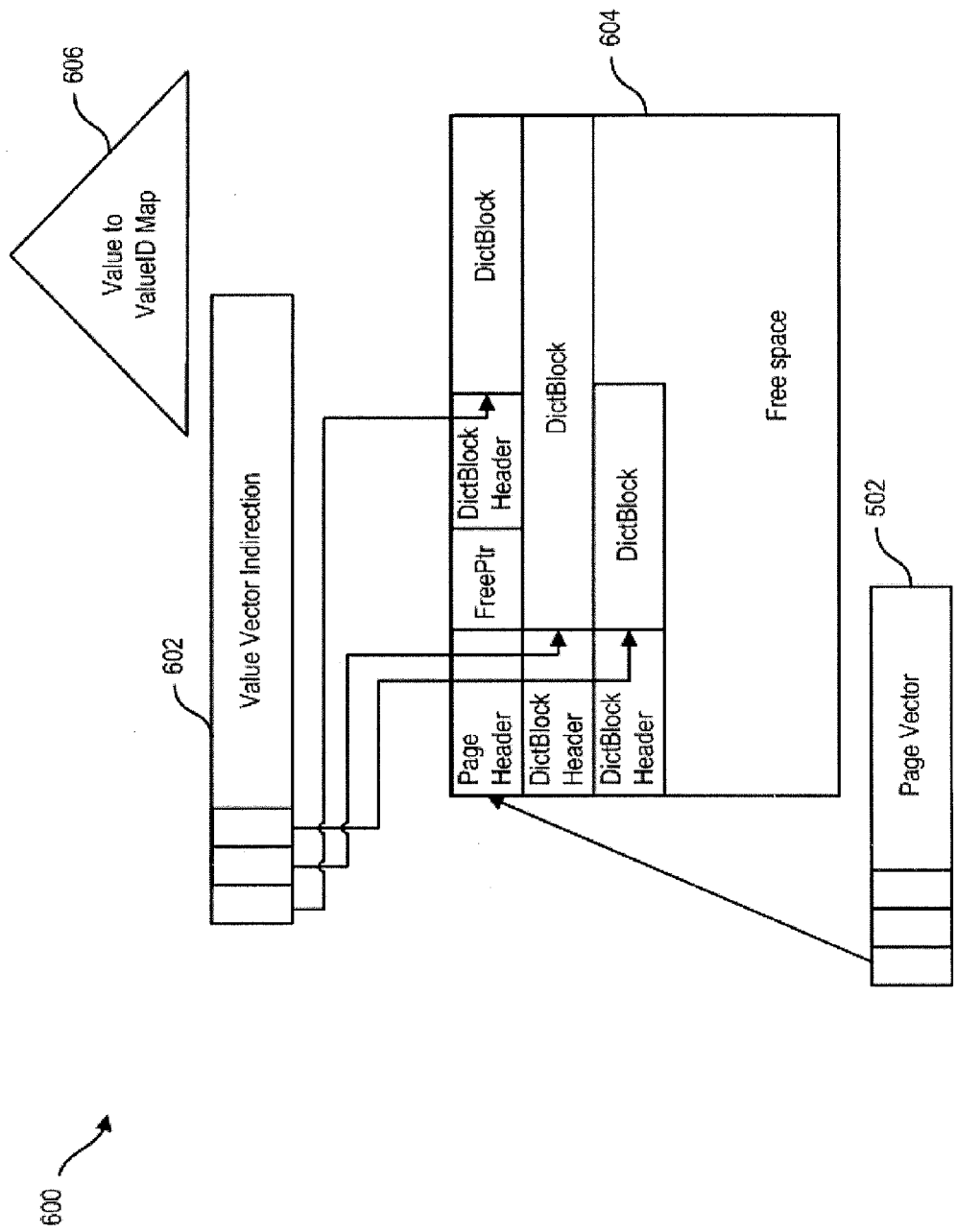
FIG. 6 is a diagram illustrating features of a unified table unsorted dictionary.

FIG. 6 shows a block diagram of a unified table unsorted dictionary 600. Consistent with one or more implementations of the current subject matter, column data in a delta part can use unsorted dictionaries. A transient structure can be provided per delta column dictionary. The page vector 502 can handle pinning of pages in memory. Direct access can be provided via a pointer from other structures. A value vector indirection 602 can allow a same number of values per dictionary block 604. This capability can support an order of 1 performance cost for lookup of a value by ValueID. A dictionary can assign a unique ValueID (typically a numeric value) to each unique value such that the unique values (which are typically larger in memory size than the ValueID) can be stored once rather than multiple times. A value array is a structure used by the dictionary to retrieve values given a ValueID or vice versa. This technique, which can reduce the amount of memory needed to store a set of values where the values are not unique, is typically referred to as dictionary compression. A Value to ValueID map 606 can support hash or B-tree sizes on the order of 1 or on the order of log n for lookup of ValueID by value. A B-tree is a tree data structure that keeps data sorted and allows searches, sequential access, insertions, and deletions in logarithmic time. This capability can be necessary for dictionary compression. A B-tree can be better for range scans but can be more expensive to maintain.

Figure 7:
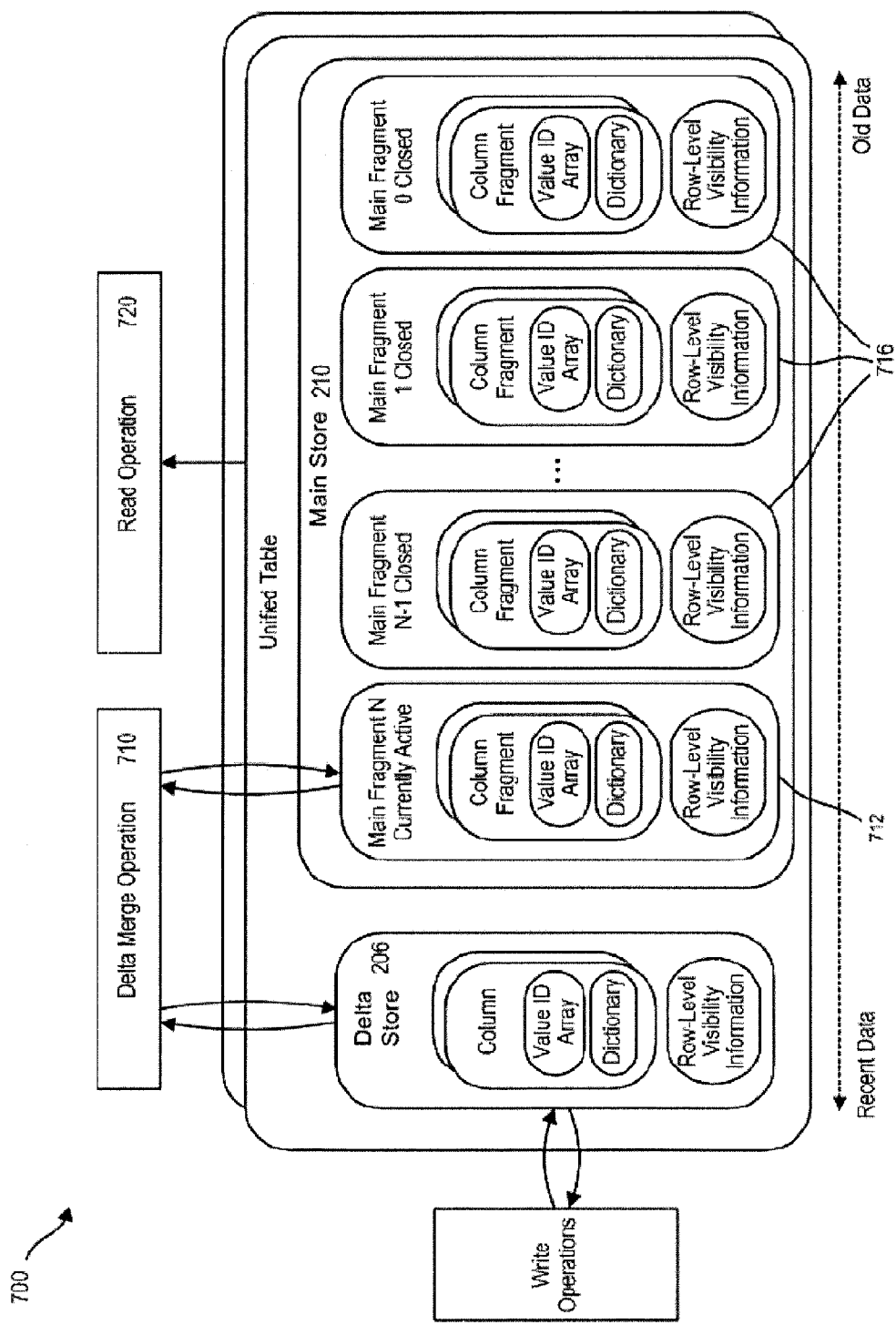
FIG. 7 is a functional block diagram illustrating performing a delta merge operation and a read operation using a unified table.

FIG. 7 shows a functional block diagram 700 for performing a delta merge operation 710 on a unified table. New transactions or changes can initially be written into delta store 206. Main store 210 can include one active fragment 712 and one or more closed fragments 716. When updates are merged from delta store 206 into the main store 210, existing records in the closed fragments 716 cannot be changed. Instead, new versions of the records can be added to the active fragment 712, and old versions can be marked as invalid.

Functional block diagram 700 also illustrates a read operation 720. Generally, read operations can have access to all fragments (i.e., active fragment 712 and closed fragments 716). Read operations can be optimized by loading only the fragments that contain data from a particular query. Fragments that do not contain such data can be excluded. In order to make this decision, container-level metadata (e.g., a minimum value and/or a maximum value) can be stored for each fragment. This metadata can be compared to the query to determine whether a fragment contains the requested data.

Figure 8:
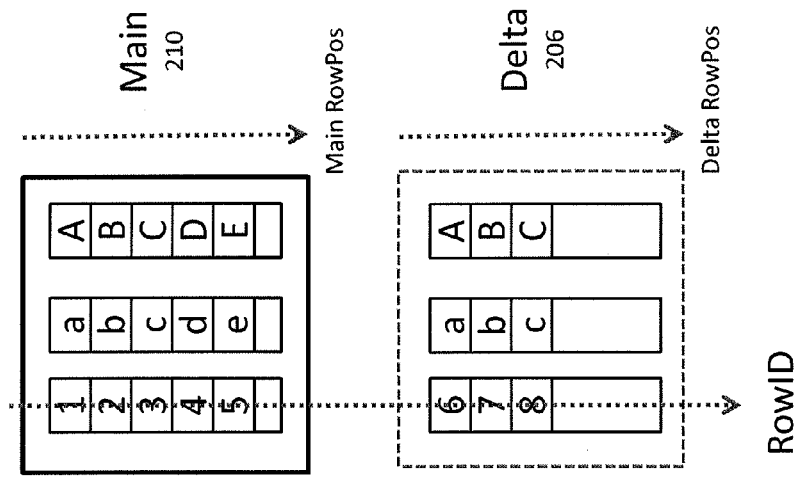
FIG. 8 is a diagram the relation between row position and row identifier.

With reference to diagram 800 of FIG. 8, as used by the database 180, the rowID is the identifier row in the table. Whether, the row is in the delta store 206 or the main store 210, the rowID remains the same but the rowID remains the same. The rowID is persisted. In contrast, the rowPOS refers to the index of the row in the column vector of delta store 206 or main store 210. rowPos is local to the container (i.e. delta2/delta/main) and will change after the delta merge operation. rowPOS can be loaded in memory. MVCC data can be maintained based on the rowPos values. Each rowPos can be mapped to a slot in the MVCC page for retrieving its associated information.

The database 170 can use version vectors that can provide lock-less read and writes in a concurrent environment. With such an arrangement, the clients can check the size of the data object before trying to store a new data element and, if necessary, increases the size of the data object. Increasing the versioned data object can create a new version of the data object with the appropriate size requirements and which is hooked to the versioned vector header (e.g., a header referencing the data object and version, etc.). With this arrangement, any concurrent reader using a previous version of a data object will still read its own version (which is consistent). Old versions of the data object are garbage collected (i.e., the memory associated with such object is freed up by a garbage collector, etc.) after all the readers are completed with their work.

A versioned vector can also provide an append API to store the data in the vector and to ensure that any new data will be written to all the versions of the data object. For example, task T1 is appending its value to the vector having size 10 and another task T2 is also trying to append at the same slot (last element), then one of the task creates a new version of the data object. In order to make both writes as visible, versioned vectors can check the latest version of the data object after completing the write. If there is any change in the version then it will copy the data to new versions.

Unfortunately, if the data is stored at random offset of the versioned vector then the client should also need to validate that data is written to all the versions of the data object. Otherwise it will lead to data in-consistency across versions of the data object.

The database 170 can write timestamps to each record to allow for determinations to be made whether such records are available as part of a consistent view. These timestamps can be represented as integer values (e.g., 64 bits, etc.). Each in-flight transaction can be represented by a transaction index (e.g., 32 bit length, etc.) which can, for example, be an index number of a transaction control block in an array of transaction control blocks (referred to herein as a transaction control block index or simply TCB index). In some cases, the array of transaction control blocks can be pre-allocated (as opposed to being dynamically allocated).

In order to allow an in-flight transaction to read its own writes (i.e., records that the transaction writes to, etc.), the consistent view can be based not only on a timestamp but also on the TCB index of the transaction. With reference to Table 1 below, each time stamp can be encoded with at least one bit being a flag indicating whether it is a final time stamp or it is a temporary timestamp. The final timestamp can also include a portion encapsulating the commit timestamp. The temporary time stamp can also include a portion encapsulating the corresponding TCB index value.

Figure 9:
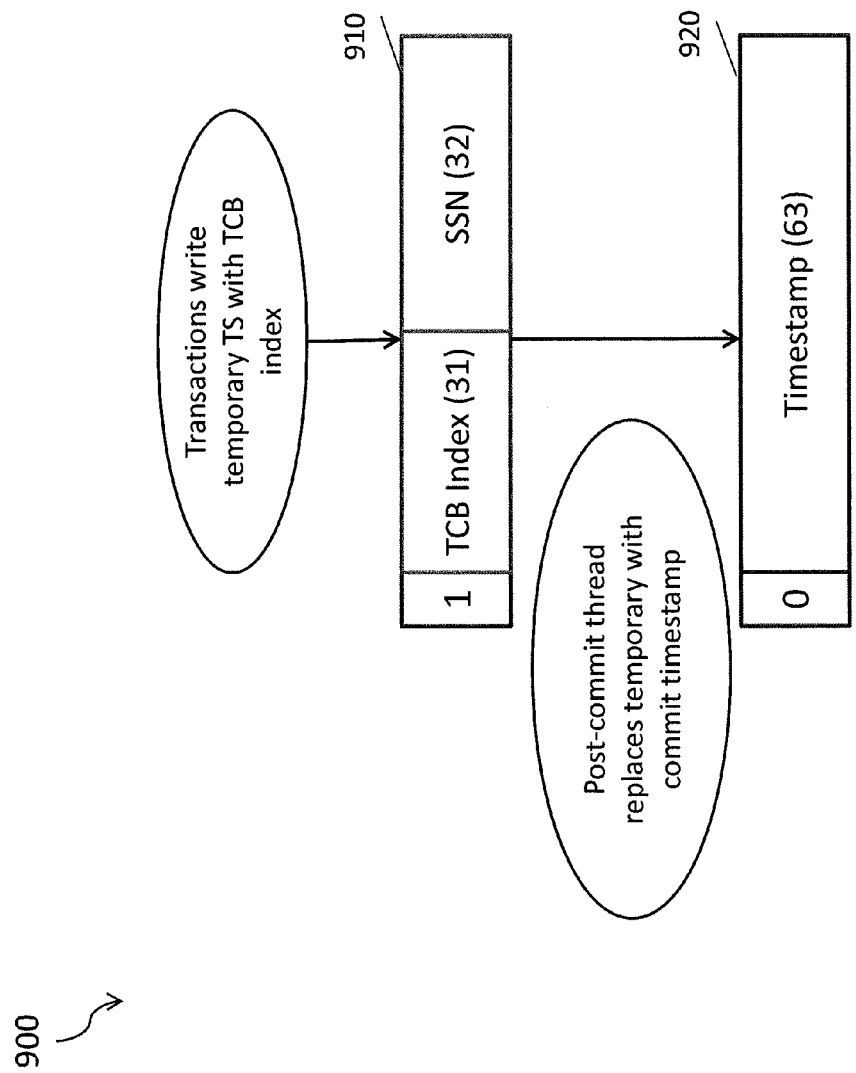
FIG. 9 is a diagram illustrating temporary and final timestamps for a row.

Diagram 900 of FIG. 9 illustrates an MVCC timestamp. In this example the timestamp comprises a 64 bit value that can include a temporary timestamp 910 (as indicated by the initial bit) or a final timestamp 920 (as indicated by the initial bit). The temporary timestamp 910 can include a transaction control block (TCB) index which identifies the corresponding transaction as well as a statement sequence number (SSN) which can be assigned by a SQL engine. The TCB index, for example, can consume 31 bits, and the SSN can consume 32 bits. The final timestamp 920 can comprises a commit timestamp which can be obtained from a TCB. Transactions can initially write the temporary timestamp 910 with the corresponding TCB index. After the corresponding thread commits, the post-commit thread can replaces the temporary timestamp 910 with the final timestamp 920.

Figure 10:
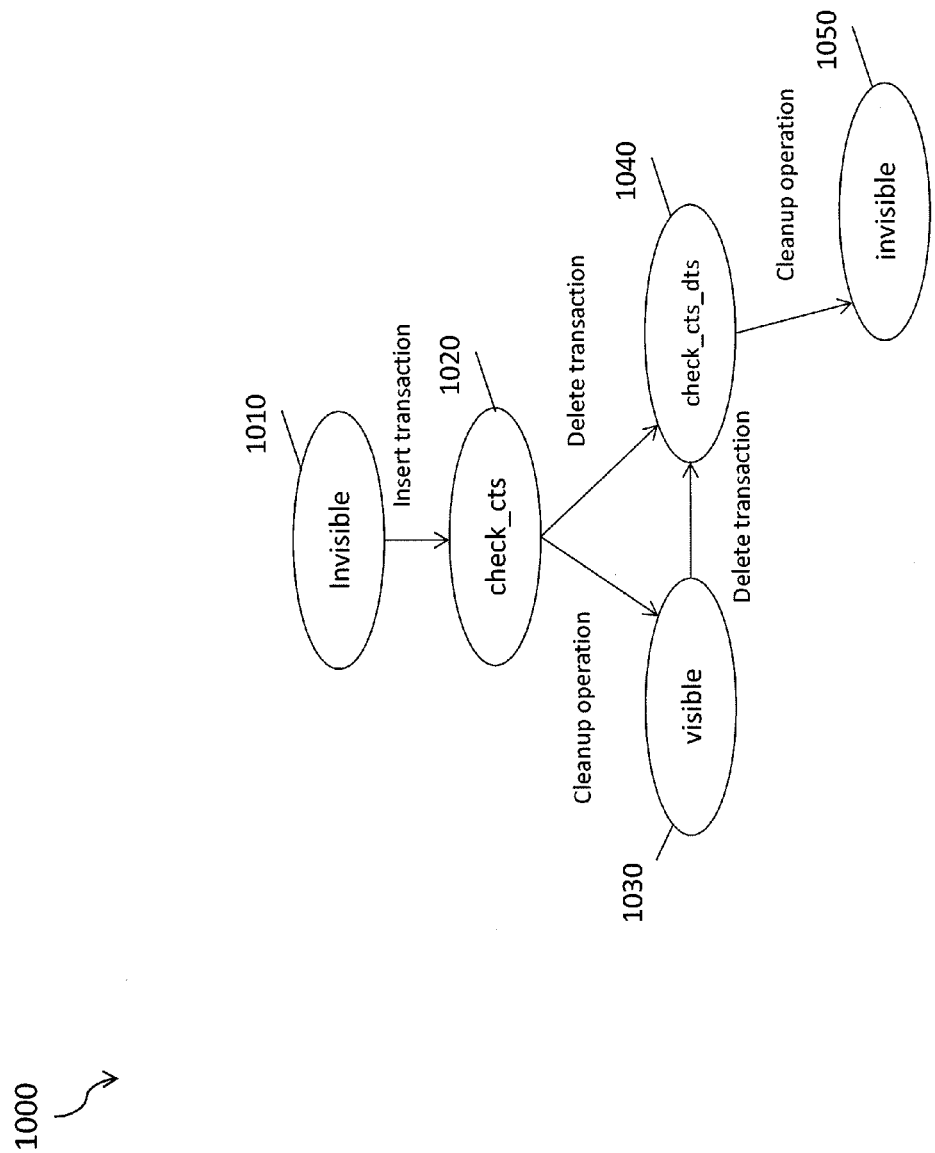
FIG. 10 is a diagram illustrating row states.

MVCC data can have various row states that characterize a current state of the row. This row state is in addition to time stamp such as CTS which is a commit time stamp of the transaction that inserted the row (64 bit value), and DTS which is a commit time stamp of the transaction that deleted the row (64 bit value). Row state (sometimes referred to as RowState) can be a two bit value as follows:
  a. 00—INVISIBLE
  b. 01—CHECK_CTS
  c. 10—VISIBLE
  d. 11—CHECK_CTS_DTS Referencing again FIG. 10, initially, the row, at 1110, has an invisible row state prior to its use (bit value 10). Unused rows can have maximum CTS and DTS values to indicate same. Next, at 1020, an insert transaction causes the row state to change to CHECK_CTS (bit value 01). If the transaction is then cleaned up (i.e., the transaction is committed, etc.), at 1030, the row state changes to visible (bit value 10) which allows the corresponding row to be fully viewable. If the transaction is then deleted (either before being committed or afterwards), at 1040, the row state will be changed to CHECK_CTS_DTS (bit value 11) which indicates that both time stamps need to be analyzed to determine the time window in which the row is valid. Thereafter, the row delete is committed and the row can be sent to garbage collection as part of a cleanup operation which causes, at 1050, the row state to then become invisible (bit value 10). In a committed delete state, the CTS and the DTS values can be zero.

As can be appreciated from the above, the most efficient access to data uses the RowPos (i.e., direct indexing of arrays). However, during a merge operation, the RowPos can change as new table fragments are created and, as such, the RowPos will change. In general, redo/undo actions do not form part of a merge operation. For example, the cleanup of a database manipulation language (DML) operation (e.g., selecting, inserting, deleting and updating data in the database 170), only happens after the outcome of such operation is merged.

Therefore, one option for redo/undo logging is to rely on the RowID which is preserved by the merge and which, for example, can be looked up using the RowID index 506. However, such an arrangement is less than optimal as each row/record requires a lookup of RowID to RowPos. This factor is relevant to performance because post-commit and cleanup undo actions are part of the steady-state transactional behavior (as opposed to all redo and undo, which are exceptions: rollback or crash recovery).

As noted above, fragments can have fragment identifiers (also referred to herein as FragIDs). With the current subject matter, new fragments generated as part of a merge operation can each have a different and unique FragID. Instead of the redo/undo logging simply writing the RowID and the RowPos for each row, the FragID can also be written (so that each row/record comprises (RowID; (FragID; RowPos)).

With redo/undo actions, if the FragID is available in the UT container, then the RowPos is used. Otherwise, the RowID index is used. This is optimal as in most cases, the redo/undo actions are executed within the same merge epoch as the DML having logged them.

Figure 11:
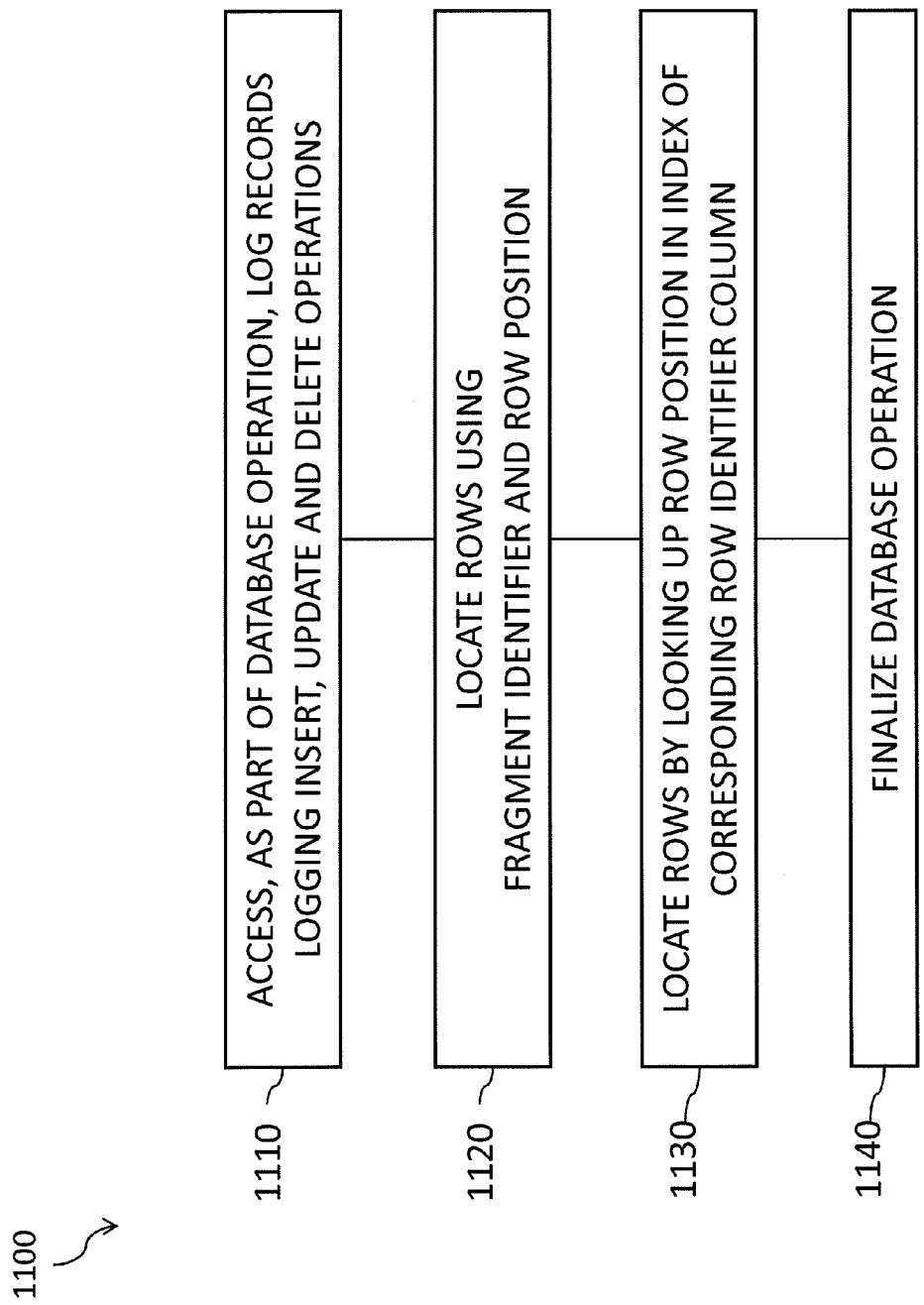
FIG. 11 is a process flow diagram illustrating efficient undo/redo logging using fragment identifiers.

FIG. 11 is a diagram 1100 in which, at 1110, log records are accessed as part of a database operation in a database. The log record log insert, update, and delete operations in the database. In addition, the log records include, for each row, a row position, a fragment identifier (ID), and a row ID. The row position represents an offset of the corresponding row in an array. The fragment ID represents an immutable identifier of a fragment of a table corresponding to the row. The row ID represents an immutable identifier of the row. Thereafter, as part of the database operation, rows specified by the log records are located either, at 1120, by using the fragment identifier and the row position within the corresponding record of the log if the fragment with the corresponding fragment identifier is still available, otherwise, at 1130, by using the row identifier within the corresponding record of the log to look up the row position in an index of a corresponding row identifier column. Subsequently, at 1140, the database operation is finalized using the located rows.

Such an arrangement is advantageous because using the fragment identifier and the row position is faster than using the row identifier to look up the row position in the index of a corresponding row identifier column. Further, each fragment can form part of a unified table container.

The replay operation can use the redo log at startup time. The undo operation can use the undo log at transaction processing time. The undo operation can be part of a transaction rollback or a post-commit operation. The cleanup operation can be part of a transaction commit. The replay operation, undo operation, and cleanup operation can all act on a visibility data structures for the corresponding records.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
    accessing, as part of a database operation in a database, log records logging insert, update, and delete operations in the database, the log records including a row position, a fragment identifier (ID), and a row ID of a row in a table, the row position representing an offset where the row is stored in an array of a fragment of a table, the fragment ID representing an immutable identifier of the fragment at which the row is stored, and the row ID representing an immutable identifier of the row;
    in response to a determination that the fragment having the fragment ID is available in the database, using the fragment ID and the row position of the row to locate the row as part of the database operation;
    in response to a determination that the fragment having the fragment ID is unavailable in the database, using the row ID of the row to determine a new row position of the row, the new row position being determined based on an index that maps row IDs to corresponding row positions; and
    finalizing the database operation using the located rows.

2. The method of claim 1, wherein the database operation comprises a redo operation, an undo operation, a post-commit operation, and/or a cleanup operation.

3. The method of claim 2, wherein the database operation is performed on a delta fragment and/or a main fragment of the table.

4. The method of claim 3, wherein each fragment comprises a plurality of columns comprising: a row ID column, user data columns, and multi-version concurrency control (MVCC) information.

5. The method of claim 4, wherein each fragment comprises, for each column, an array of column values, and at least one array comprising the MVCC information.

6. The method of claim 4, wherein the row ID column comprises the index mapping the row ID to the corresponding row positions.

7. The method of claim, 3 further comprising:
    performing an insert operation by at least appending one or more new rows to the delta fragment of the table.

8. The method of claim 3, further comprising:
    performing a delete operation by at least invalidating one or more old rows in a corresponding fragment of the table.

9. The method of claim 8, wherein the invalidated old rows are in the main fragment and/or the delta fragment of the table.

10. The method of claim 1, wherein the new row position is assigned to the row during append time for an insert operation and/or update operation in the delta fragment of the table, the new row position corresponding to new offset where the row is stored.

11. The method of claim 3, further comprising:
    initiating a merge operation moving a plurality of rows from an old delta fragment to a new main fragment.

12. The method of claim 11, further comprising:
    generating a new delta fragment; and
    dropping the old delta fragment and an old main fragment after the plurality of rows are completely moved to the old delta fragment to the new main fragment.

13. The method of claim 12, further comprising:
    assigning a respective fragment ID to each of the new delta fragment and the new main fragment.

14. The method of claim 12, further comprising:
    assigning a new row position to each of the plurality of rows moved from the old delta fragment to the new main fragment, the new row position corresponding to a new array offset where each row is stored in the new main fragment, each row maintaining the same row ID.

15. The method of claim 6, wherein the determining of the new row position comprises:
    searching the index based at least on the row ID, the index being an inverted index within the delta fragment or the main fragment of the table; and then
    using the new row position as an offset within an array of a corresponding fragment to locate the row.

16. The method of claim 15, wherein the row position specified in the log records cannot be used if a merge operation completes between creation of the log records and the database operation.

17. The method of claim 1, wherein if a merge operation does not complete between creation of the log records and the database operation, using the fragment ID and the row position to locate the row is faster than using the row identifier to look up the row position in the index to locate the row.

18. The method of claim 1, wherein the database is an in-memory column-oriented database.

19. A non-transitory computer program product storing instructions which, when executed by at least one data processor forming part of at least one computing device, result in operations comprising:
  accessing, as part of a database operation in a database, log records logging insert, update, and delete operations in the database, the log records including a row position, a fragment identifier (ID), and a row ID of a row in a table, the row position representing an offset where the row is stored in an array of a fragment of a table, the fragment ID representing an immutable identifier at which the row is stored, and the row ID representing an immutable identifier of the row;
  in response to a determination that the fragment having the fragment ID is available in the database, using the fragment ID and the row position of the row to locate the row as part of the database operation;
  in response to a determination that the fragment having the fragment ID is unavailable in the database, using the row ID of the row to determine a new row position of the row, the new row position being determined based on an index that maps row IDs to row positions; and finalizing the database operation using the located rows.

20. A system comprising:
  at least one data processor; and
  at least one memory storing instructions which, when executed by the at least one data processor, result in operations comprising:
    accessing, as part of a database operation in a database, log records logging insert, update, and delete operations in the database, the log records including a row position, a fragment identifier (ID), and a row ID of a row in a table, the row position representing an offset where the row is stored in an array of a fragment, the fragment ID representing an immutable identifier of the fragment at which the row is stored, and the row ID representing an immutable identifier of the row;
  in response to a determination that the fragment having the fragment ID is available in the database, using the fragment ID and the row position of the row to locate the row as part of the database operation;
  in response to a determination that the fragment having the fragment ID is unavailable in the database, using the row ID of the row to determine a new row position of the row, the new row position being determined based on an index that maps row IDs to corresponding row positions; and
  finalizing the database operation using the located rows.

* * * * *